United States Patent
Zhou et al.

(10) Patent No.: US 11,689,128 B2
(45) Date of Patent: Jun. 27, 2023

(54) DRIVE CONTROL SYSTEM FOR A LINEAR DRIVER

(71) Applicant: eMoMo Technology Co., Ltd., Shenzhen (CN)

(72) Inventors: Wei Zhou, Shenzhen (CN); Yushu Zhao, Shenzhen (CN); Jing Song, Shenzhen (CN); Wenbing Guo, Shenzhen (CN); Ming Kong, Shenzhen (CN); Tao Jiang, Shenzhen (CN)

(73) Assignee: EMOMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/546,008

(22) Filed: Dec. 8, 2021

(65) Prior Publication Data
US 2022/0385214 A1    Dec. 1, 2022

(30) Foreign Application Priority Data
May 26, 2021    (CN) .......................... 202110580014.5

(51) Int. Cl.
*H02P 6/30*    (2016.01)
*H02P 6/20*    (2016.01)
*H02P 6/24*    (2006.01)

(52) U.S. Cl.
CPC ................. *H02P 6/30* (2016.02); *H02P 6/20* (2013.01); *H02P 6/24* (2013.01)

(58) Field of Classification Search
CPC ................. H02P 6/30; H02P 6/20; H02P 6/24
USPC ............................. 318/400.26, 400.01, 700
See application file for complete search history.

(56) References Cited

U.S. PATENT DOCUMENTS

| | | | | |
|---|---|---|---|---|
| 5,220,259 A | * | 6/1993 | Werner | H02P 6/06 318/434 |
| 6,590,358 B1 | * | 7/2003 | Tsutsui | G05B 5/01 318/632 |
| 7,088,067 B2 | * | 8/2006 | Yamamoto | H02P 6/10 318/434 |
| 7,576,509 B2 | * | 8/2009 | Komatsu | H02P 6/15 318/807 |

* cited by examiner

*Primary Examiner* — David Luo

(57) ABSTRACT

A drive control system for a linear driver may include a power module, a controller, a motor drive module, a motor, and a position control module. The power module may be connected to the controller, the controller may be connected to the motor drive module, and the position control module may be connected in series between the controller and the motor drive module to form a control loop. The power module may be connected to the motor drive module to input power to the motor drive module, and the motor drive module may be connected to the motor to form a drive loop. The control loop may control the work of the drive loop, and the drive loop may directly form a loop in series connection with the motor and the power module through the motor drive module.

19 Claims, 5 Drawing Sheets

DRIVE CONTROL SYSTEM FOR A LINEAR DRIVER

CROSS-REFERENCE TO RELATED APPLICATIONS

This application claims priority to Chinese Patent Application No. 202110580014.5, filed May 26, 2021, which is hereby incorporated by reference herein as if set forth in its entirety.

BACKGROUND OF THE DISCLOSURE

The disclosure relates generally to a control system, and in particular to a drive control system for a linear driver in the field of smart home accessories control.

Linear drivers, which are also referred to as straight line drivers, linear push rods, or push rods) are widely used in all kinds of smart furniture, such as smart sofas, smart beds, massage chairs, etc. The linear motion made by the linear driver is used for adjusting various posture parameters of the smart furniture, such as height, tilt angle, front and rear positions, etc.

A traditional linear driver is usually equipped with an external drive power supply of which the general rated voltage is +24V. Due to errors of electronic components such as transformers, the voltage of the external power supply of the linear driver occasionally reaches+29V. Referring to FIG. 1 and FIG. 2, a drive control loop for a traditional linear driver includes a power module (i.e., power supply), a controller, a motor, and a position control module, and all loads and control switch modules are connected in series in a closed loop.

When the linear driver is installed on a device or product on which it will be used, an on-board low-voltage power supply usually with a rated voltage of +12V (the working voltage reaches+12.8V~+13.6V) is included and the drive control loop of the traditional linear driver can cause the linear driver to fail to work normally due to a long control circuit, and large line loss and node resistance. An external transformer is required to convert the +12V on-board low-voltage power supply into the +24V power supply, through the transformer, which increases the usage cost. In view of the disadvantages of traditional linear drivers which cannot be driven by a +12V power supply, the disclosure provides a drive control system for a linear driver which reduces loop length and connection points, to reduce unnecessary line loss. The exemplary embodiments of a drive control system comprise a drive loop that directly forms a loop in series connection with a motor and a power module through a motor drive module, and a control loop that controls the operation of the drive loop. According to the exemplary embodiments, the control loop controls the work of the drive loop, and the drive loop forms a loop as a series connection between the motor and the power module through the motor drive module, so as to reduce the loop length and connection points, to reduce unnecessary line loss and connection point loss, and to directly power the linear driver with a +12V power supply.

BRIEF DESCRIPTION OF THE EXEMPLARY EMBODIMENTS

In an aspect, the disclosure relates to a drive control system for a linear driver. The drive control system may include a power module, a controller, a motor drive module, a motor, and a position control module. The power module may be connected to the controller, the controller may be connected to a control interface of the motor drive module, and the position control module may be connected in series between the controller and the motor drive module to form a control loop. Additionally, the power module may be connected to a drive interface of the motor drive module and the motor drive module may be connected to the motor to form a drive loop.

In another aspect, the disclosure relates to a drive control system for a linear driver that may include a controller, a linear driver control loop including a power module, and a controller connector. The controller connector may be connected to each of the power module, the controller, and the linear driver control loop. The power module may provide a power supply to the controller via the controller connector, and the controller may provide a power input to the control loop via the controller connector.

In another aspect, the disclosure relates to a method for controlling a linear driver with a drive control system. The method may include providing a power supply from a power module to a controller and providing a power input from the controller to one of a control interface of a motor drive module and a position control module. The power module may be connected to the controller, the controller may be connected to a control interface of the motor drive module, and the position control module may be connected in series between the controller and the motor drive module to form a control loop. The method may also include providing a power supply to a drive interface of the motor drive module, and the motor drive module may be connected to a motor to form a drive loop.

For purposes of this disclosure, "connected" means electrically connected. For example, "connected to" means an electrical connection at an electrical interface, input, terminal, or the like as are known techniques in the art, unless otherwise specified.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which.

Figure 1:
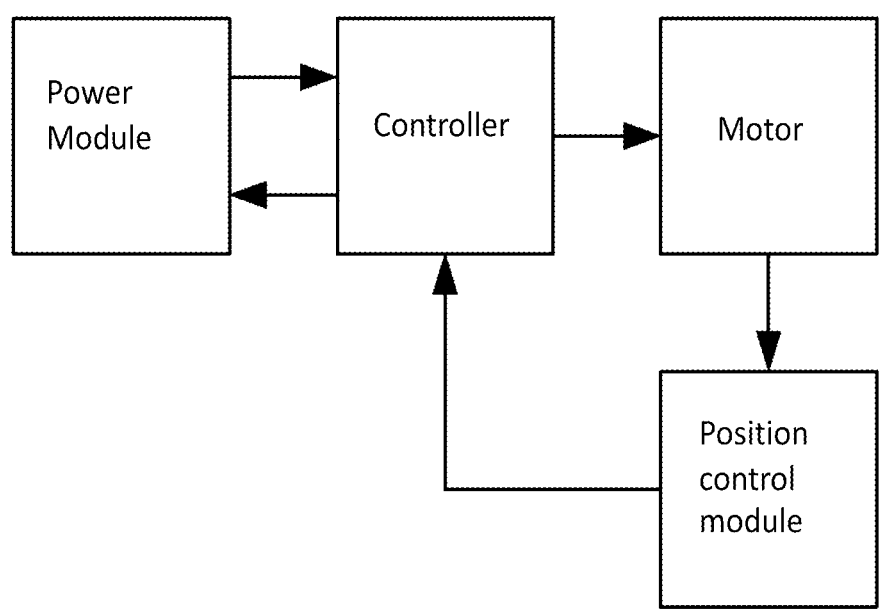
FIG. 1 is a block diagram of a prior art drive control system for a linear driver.
Figure 2:
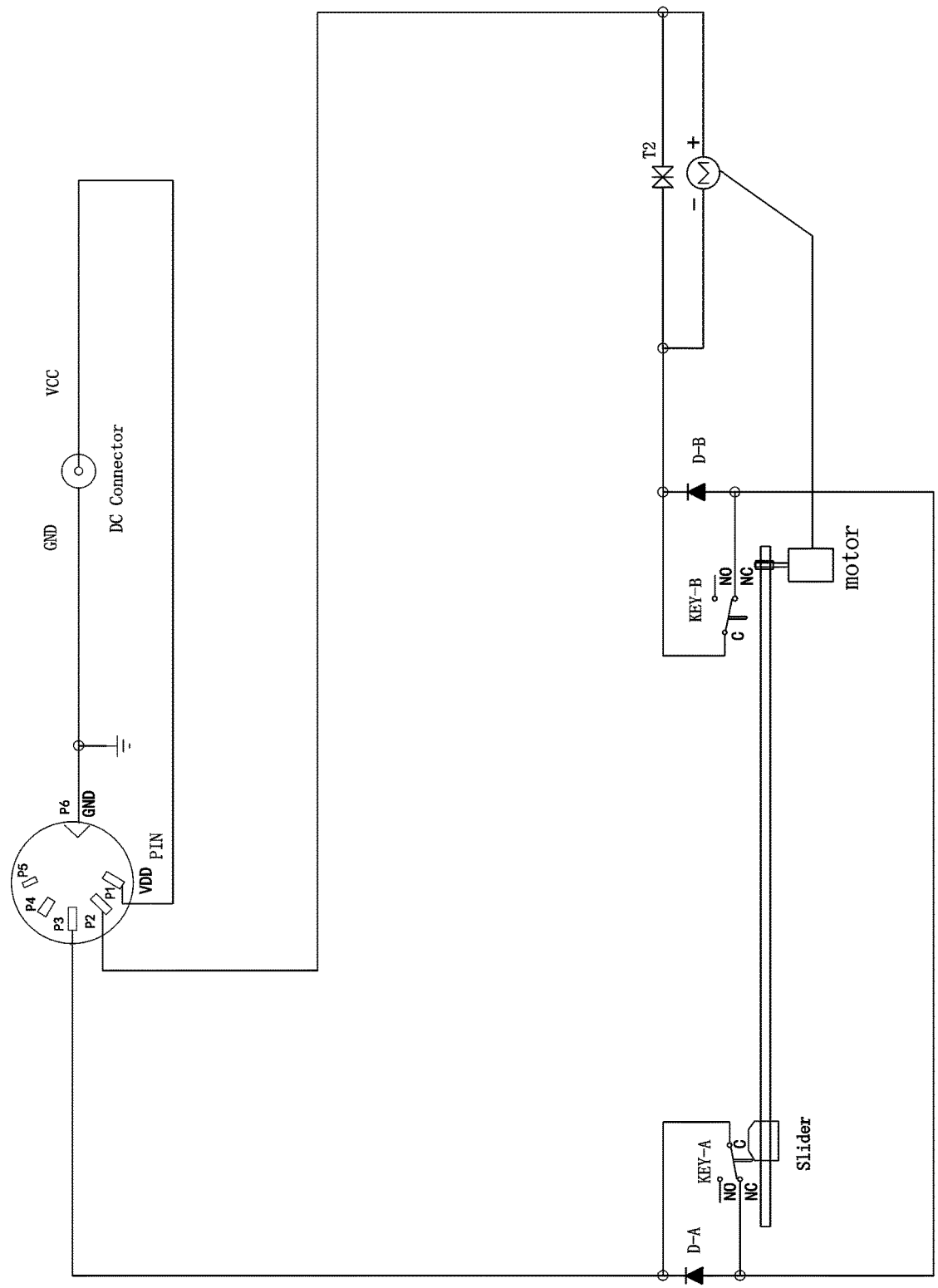
FIG. 2 is a system schematic diagram of a prior art drive control system for a linear driver.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various exemplary embodiments. Each example is provided by way of explanation and is not meant as a limitation and does not constitute a definition of all possible embodiments.

Figure 3:
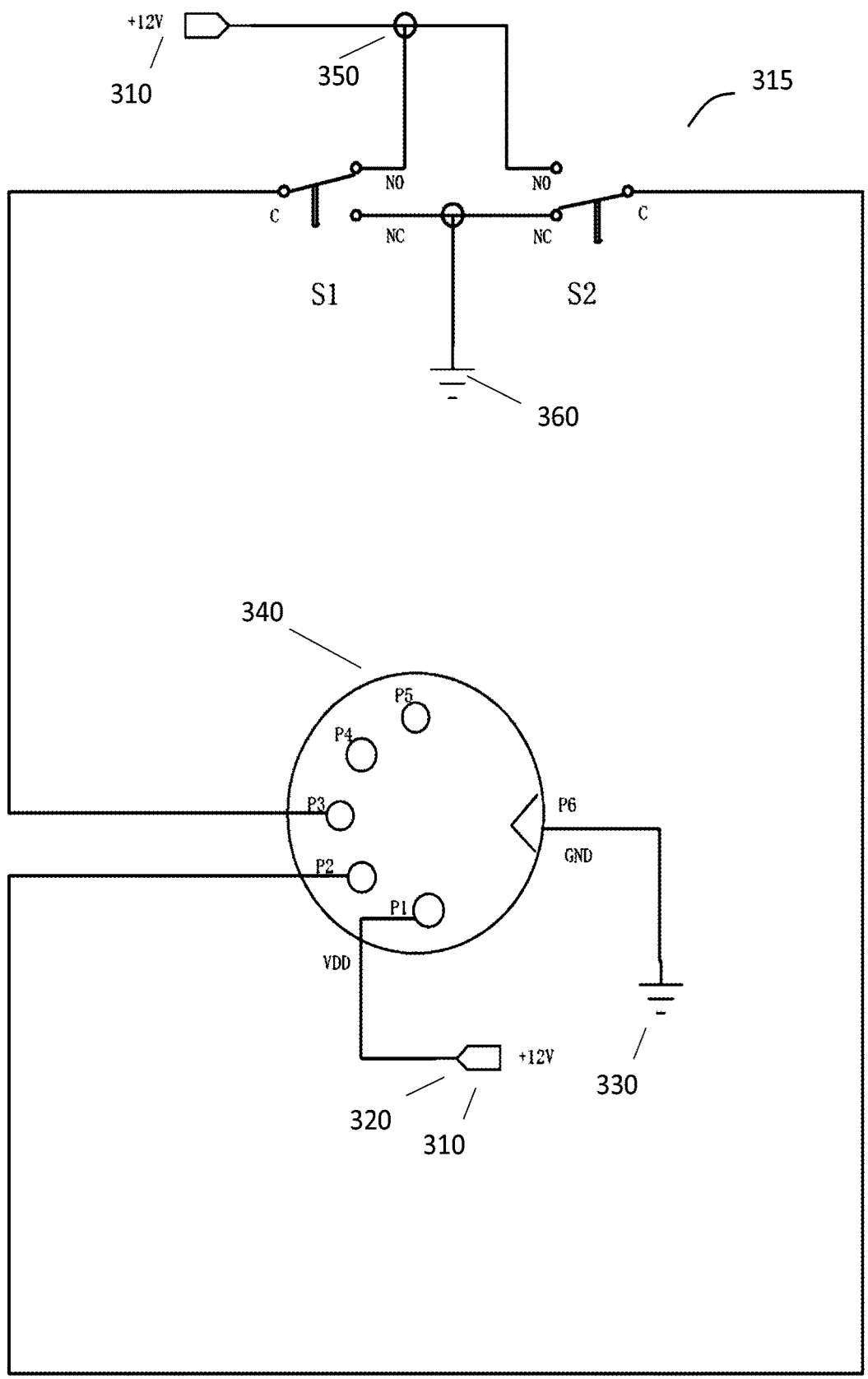
FIG. 3 is a circuit schematic diagram of a manual controller of a drive control system for a linear driver, according to an exemplary embodiment.
Figure 4:
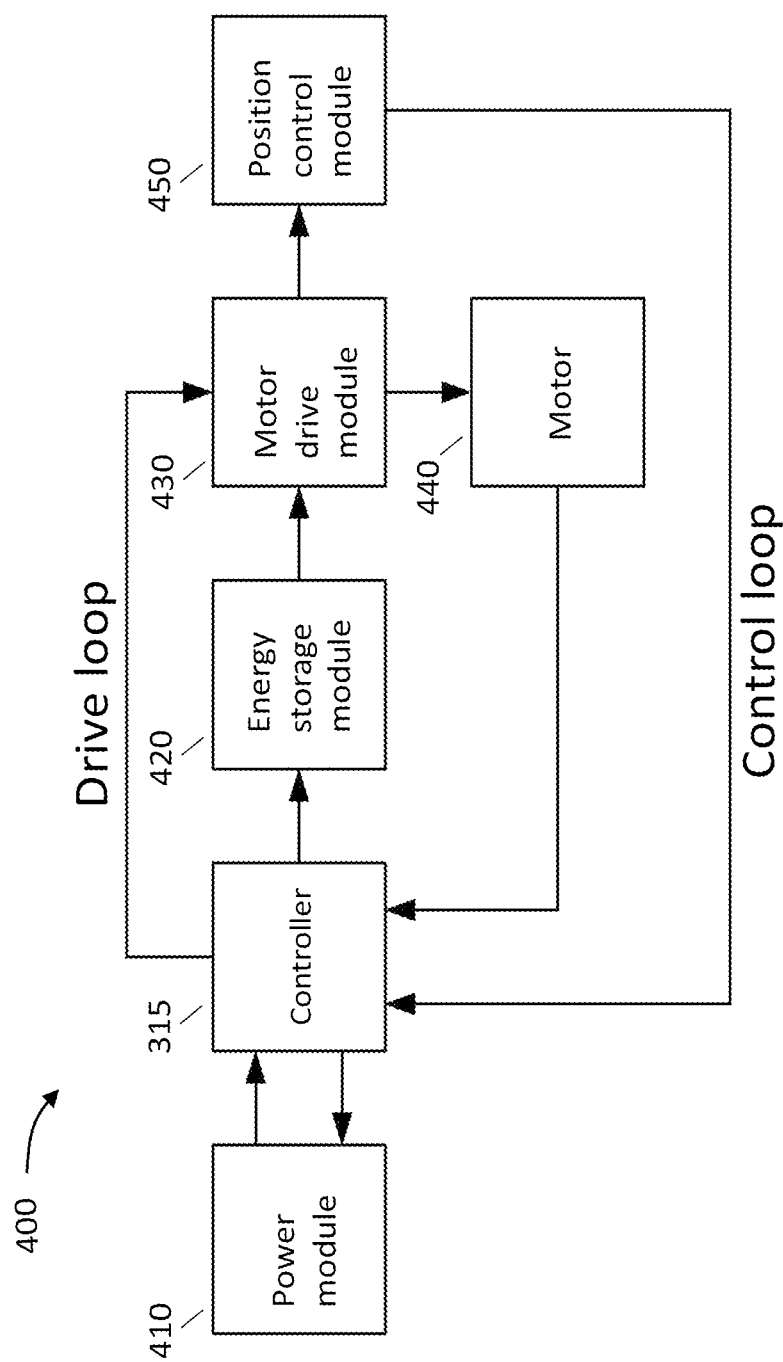
FIG. 4 is a block diagram of a drive control system for a linear driver, according to an exemplary embodiment.
Figure 5:
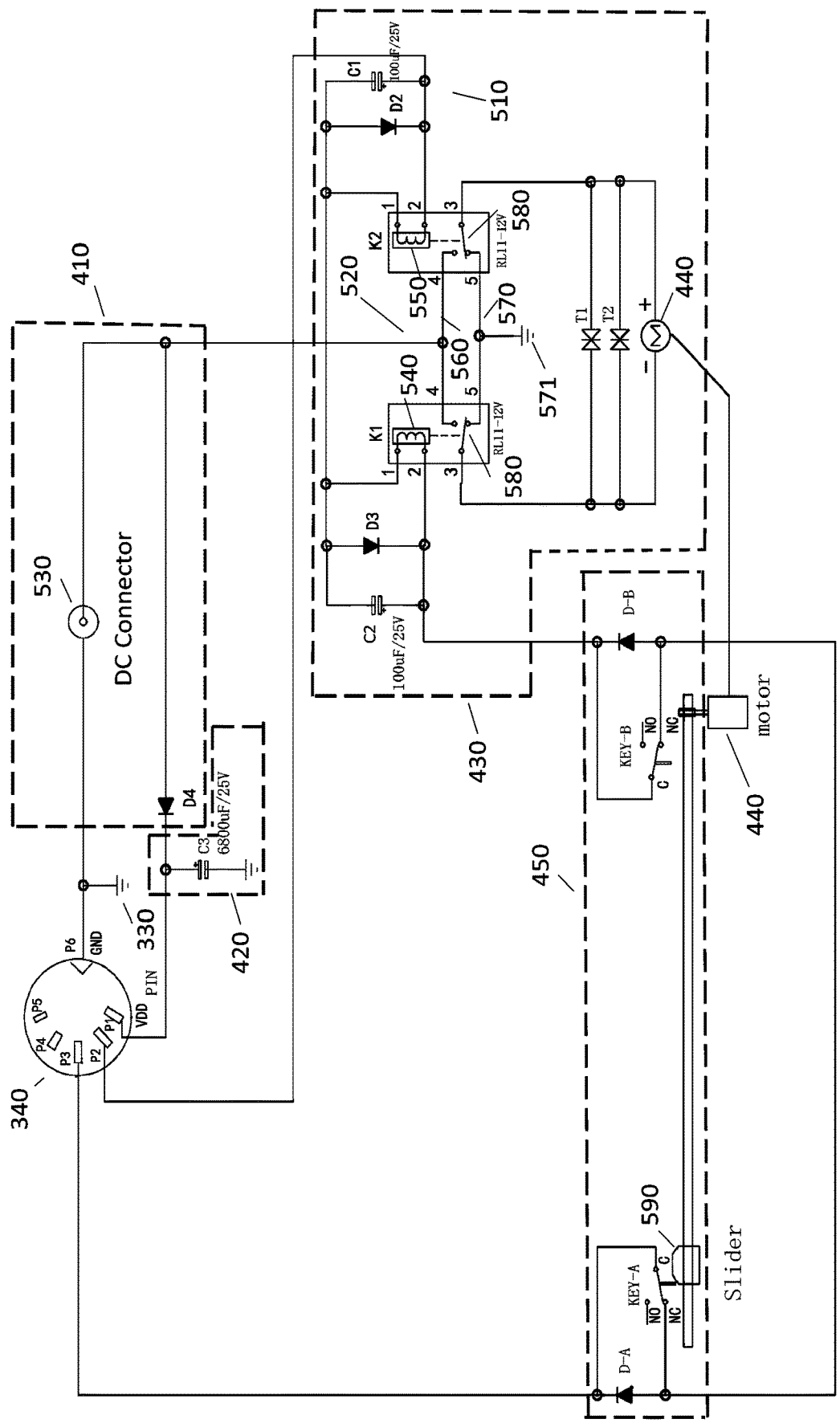
FIG. 5 is a schematic diagram of a drive control system for a linear driver, according to an exemplary embodiment.

With reference to FIGS. 3-5, an exemplary drive control system 400 for a linear driver according to the disclosure is shown. The exemplary drive control system 400 includes a power module 410, a controller 315, an energy storage module 420, a motor drive module 430, a motor 440, and a position control module 450. The power module 410 includes a power supply 310 (FIG. 3) and is connected to the controller 315, to input power to the controller 315. For purposes of this disclosure, the power supply 310 or other power inputs may be interchangeably referred to as a "positive" power input to further connote an operative power input or supply. The controller 315 is connected to a control interface 510 of the motor drive module. The position control module 450 is connected in series between the controller 315 and the motor drive module 430. The controller 315 and the position control module 450 control the work of the motor drive module 430 so as to form a control loop. The power module 410 is directly or indirectly connected to a drive interface 520 of the motor drive module 430, to provide a power supply to the motor drive module 430, and the motor drive module 430 is connected to the motor 440 to drive the motor 440 to work so as to form a drive loop.

With additional reference to FIG. 3, the power supply 310 according to an exemplary embodiment is a +12V power supply, such as a +12V external power supply, a +12V battery, or an on-board +12V power supply. In the exemplary embodiment, the power module 410 includes a direct current (DC) connector 530 for power input to the power module, from the power supply 310. For purposes of this disclosure, reference to the power module 410 including the power supply refers to the actual power supply input to the power module 410 but does not necessarily include the power supply source, e.g., an external power supply, battery, or on-board power supply, as part of the power module 410 itself, except as context makes clear. With reference to FIGS. 3 and 5, the +12V power supply includes a positive end 320 of the power supply 310 and a negative end 330 at a ground (GND) or grounding.

In the exemplary embodiment, with continued reference to FIG. 3, the controller 315 is a separately set manual controller in the device or product on which the drive control system 400 is used. The controller 315 is connected to the drive control system 400 through a controller connector 340. In other embodiments, the controller may be installed directly on/as part of the drive control system 400. The controller 315 includes a power input terminal 350, a first control switch S1, and a second control switch S2. As discussed further below, the controller 315 is connected to the controller connector 340. If the controller is installed directly on the drive control system, the controller connector 340 may be replaced by a direct wire or cable connection within the drive control system. The first control switch S1 and the second control switch S2 together control a forward rotation and a reverse rotation of the motor 440, as discussed further below. A first contact terminal ('NO') of each of the first control switch S1 and the second control switch S2 is connected to the power input terminal 350, and a second contact terminal ('NC') of each of the first control switch S1 and the second control switch S2 is connected to a controller power negative terminal 360 (i.e., GND). A common terminal ('C') of each of the first control switch S1 and the second control switch S2 is connected to the control loop through the controller connector 340. The common terminal C of the first control switch S1 is connected to a port P3 of the controller connector 340, and the common terminal C of the second control switch S2 is connected to the controller connector 340 at a port P2.

During operation, one of the first control switch S1 and the second control switch S2 is connected via the power input terminal 350 to the power supply 310 (via controller connector 340, as discussed further below), and the other is connected to the controller power negative terminal 360 (i.e., a grounding wire), so that the positive power supply 310 is connected to the control loop through either the first control switch S1 or the second control switch S2, so as to control the forward or reverse rotation of the motor 440.

In the exemplary embodiment, a port P1 and a port P6 of the controller connector 340 are respectively connected to the +12V power supply 310 (from the DC connector 530) and to GND 330. The controller 315 receives the power supply 310 via connection to the controller connector 340 which relays the power supply 310 through the port P1 to the controller 315, to input the positive power supply 310 from the DC connector 530 to the controller 315. In other words, the positive power supply 310 as shown at the power input terminal 350 of the controller 315 is provided via the connection to the power supply 310 at port P1 of the controller connector 340, although the relay between the two is not illustrated. Accordingly, the DC connector 530 provides the power supply 310 to the controller 315 via the controller connector 340.

The motor drive module 430 includes a circuit module that may be powered on to control bidirectional conduction. The exemplary embodiment includes a non-limiting arrangement of diodes and relays as discussed further below. However, other circuit structure(s) and/or configuration(s) consistent with this disclosure can also be adopted.

With reference now to FIG. 5, the exemplary motor drive module 430 includes a first motor drive diode D2, a second motor drive diode D3, a first relay K1, and a second relay K2. The first motor drive diode D2 and the second motor drive diode D3 are in reversed series connection, that is, an anode of the first motor drive diode D2 is connected to an anode of the second motor drive diode D3. In other embodiments, the reversed series connection may be in the form of a cathode of the first motor drive diode D2 being connected to a cathode of the second motor drive diode D3, with the same effect.

The cathode of the first motor drive diode D2 is connected to the controller connector 340, and the cathode of the second motor drive diode D3 is connected to the position control module 450. Specifically, the cathode of the first motor drive diode D2 is connected to a port P2 of the controller connector 340. The first relay K1 includes a control coil 540 that is connected in parallel with the second motor drive diode D3, and the second relay K2 includes a control coil 550 that is connected in parallel with the first motor drive diode D2. The first relay K1 and the second relay K2 each include at least one of a normally open contact 560, a normally closed contact 570, and a common contact 580. The normally open contacts 560 are each connected to the positive power supply from the power supply module 410 and the normally closed contacts 570 are each connected to a ground 571. The common contact 580 of the first relay K1 is connected to a negative terminal of the motor 440 and the common contact 580 of the second relay K2 is connected to a positive terminal of the motor 440. The normally open contacts 560 of the first relay K1 and the second relay K2 are respectively connected to the +12V power supply 310 (i.e. the positive power supply from the DC connector 530), and the normally closed contacts 570 are respectively grounded at the ground 571 of the DC connector 530. In other embodiments, the normally open contacts 560 can be grounded, and the normally closed contacts 570 can be connected to the +12V power supply 310 with the same effect.

In one state, the port P3 of the controller connector 340 inputs the positive power supply 310 and the port P2 of the controller connector 340 is grounded, and the control loop current is input from the port P3 of the controller connector 340, and then outputted through the position control module 450, the control coil 540 of the first relay K1, the first motor drive diode D2 (at this time, the control coil 550 of the second relay K2 is short circuited by the first motor drive diode D2), and the port P2 of the controller connector 340. In this state, the normally open contact 560 of the first relay K1 is closed and the normally closed contact 570 is open, and the normally open contact 560 of the second relay K2 is open and the normally closed contact 570 is closed. The drive loop current directly passes through the normally open contact 560 of the first relay K1, then flows through the motor 440, and then connects to the ground 571 (i.e., negative pole) of the power supply 310 (i.e., the DC connector 530) through the normally closed contact 570 of the second relay K2. Forward rotation of the motor 440 is created in this state.

When the port P2 of the connector inputs the positive power supply 310 and the port P3 of the controller connector 340 is grounded, the control loop current is input from the port P2 of the controller connector 340 and then outputted through the second motor drive diode D3 (at this time, the control coil 540 of the first relay K1 is short circuited by the second motor drive diode D3), the position control module 450, and the port P3 of the controller connector 340. At this time, the normally open contact 560 of the second relay K2 is closed and the normally closed contact 570 is open, and the normally open contact 560 of the first relay K1 is open and the normally closed contact 570 is closed. The drive loop current passes through the normally open contact 560 of the second relay K2, then flows through the motor 440, and then passes through the normally closed contact 570 of the first relay K1 before being connected to the ground 571 of the power supply 310. In this state, the motor rotation is reverse.

In an aspect, a first motor drive capacitor C1 is connected in parallel with the first motor drive diode D2, and a second motor drive capacitor C2 is connected in parallel with the second motor drive diode D3, so that the working voltage of the first relay K1 and the second relay K2 may be more stable and the working effect better.

In the exemplary embodiment, the first relay K1 and the second relay K2 are used without limitation as forming a part of the motor drive module 430. In other embodiments, other components may be used consistent with this disclosure. The input signals of the port P2 and the port P3 of the controller connector 340 are used as control signals to control the on-off of the motor drive module 430, so as to realize the reversal of the current flowing through the motor 440, and then to control the forward or reverse rotation of the motor 440. For example, in an exemplary embodiment, four triodes, metal-oxide semiconductor (MOS) tubes, and insulated-gate bipolar transistors (IGBT) (not shown) may be used, of which two of each are connected to the motor forward rotation loop (i.e., one is connected between the motor 440 and the positive power supply 310, and the other is connected between the motor 440 and the ground 571), and two are connected to the motor reverse rotation loop. The control ends of the two triodes, MOS tubes, or IGBTs connected to the motor forward rotation loop are connected to the port P3 of the controller connector 340. When a positive power supply is input at the port P3 of the controller connector 340, the motor 440 is controlled to rotate forward. The control ends of the two triodes, MOS tubes, or IGBTs connected to the motor reverse loop are connected to the port P2 of the controller connector 340. When a positive power supply is input at the port P2 port of the controller connector 340, the motor 440 is controlled to rotate reversely. The use of the triodes, MOS tubes, IGBTs, etc. is exemplary and other components, such as a switch chip, can also be used consistent with this disclosure.

With continuing reference to FIG. 5, the position control module 450 in the exemplary embodiment includes a first travel switch KEY-A and a second travel switch KEY-B. A first position control diode D-A is connected in parallel with the first travel switch KEY-A, and a second position control diode D-B is connected in parallel with the second travel switch KEY-B. The first position control diode D-A and the second position control diode D-B are connected in reverse series, that is, an anode of the first position control diode D-A and an anode of the second position control diode D-B are connected to each other. A cathode of the first position control diode D-A is connected to the port P3 of the controller connector 340, and a cathode of the second position control diode D-B is connected to the motor drive module 430. The first position control diode D-A and the second position control diode D-B in reverse series connection prevents the control loop from being conductive in both directions.

When the first travel switch KEY-A and the second travel switch KEY-B respectively short circuit the first position control diode D-A and the second position control diode D-B, the control loop is conductive at the position control module 450. For example, when the port P3 of the controller connector 340 inputs the positive power supply 310, the positive power supply 310 is outputted to the motor drive module 430 through the first travel switch KEY-A, then the second travel switch KEY-B, and finally outputted through the port P2 of the controller connector 340. At this time, the motor 440 rotates forward and a slider 590 moves to the left (as representatively but without limitation depicted in FIG. 5). When touching the first travel switch KEY-A, the slider 590 disconnects the first travel switch KEY-A. The first position control diode D-A is connected to the control loop in the reverse direction; thus, when the first travel switch KEY-A is disconnected, the whole control loop is not conductive, and the motor 440 stops rotating, indicating that the slider 590 has arrived at the first travel switch KEY-A. At this time, both of the second travel switch KEY-B and the second position control diode D-B are conductive although the control loop overall remains nonconductive. When the positive power supply 310 is input from the port P2 of the controller connector 340, the current flow direction via the second travel switch KEY-B is opposite to that described above through the first travel switch KEY-A. In the exemplary embodiment, the travel switches KEY-A, KEY-B are used without limitation as forming a part of the position control module 450. In other embodiments, different components and/or configurations, e.g., hall switches and mercury switches, can be used consistent within this disclosure. Alternatively, if the motor 440 is a stepper motor or a servo motor, the position control module 450 may be configured and programmed to control the motor travel solely by software.

In an aspect, and with continuing reference to FIG. 5, transient voltage suppression (TVS) tubes T1 and T2 are connected in parallel with the motor 440, which may prevent the impact of peak pulse and surge current on the operation of the motor 440. In other embodiments, other protective element(s) with similar function can also be used consistent with this disclosure and as applications dictate.

In a further aspect, a power input diode D4 is connected in series on the positive power input of the drive loop. When the motor 440 starts, the voltage to the drive loop may immediately drop to 5V or lower. In order to prevent the impact of the motor starting on a charging circuit (not shown) in the controller 315, the power input diode D4 may isolate the power supply. An energy storage module 420, namely, a power input capacitor C3, is also connected to the power input. The power input diode D4 and power input capacitor C3 may make the power supply smoother and better protect a charging circuit in the controller 315.

In use, the switch S1 is pushed on the controller 315 providing the positive power supply 310 to the control loop. The power supply 310 is input through the port P3 of the controller connector 340, after passing through the switch S1, and then through the control loop through the first travel switch KEY-A, the second position control diode D-B (or the second travel switch KEY-B), the control coil 540 of the first relay K1 and the first motor drive diode D2, and finally the port P2 of the controller connector 340, which forms a complete control loop. At this time, in the drive loop, the normally open contact 560 of the first relay K1 is conductive, and the positive power supply 310 flows into the motor 440 through the normally open contact 560 of the first relay K1, and then passes through the normally closed contact 570 of the second relay K2 to the ground 571. The motor 440 rotates forward. When the slider 590 slides to the first travel switch KEY-A, the first travel switch KEY-A is disconnected, and the motor 440 stops. When the controller switch S2 is pressed, the process is reversed.

In an aspect, the exemplary embodiments are directed to a drive control system for a linear driver that comprises a power supply module, a controller, a motor drive module, a motor, and a position control module. The power supply module is connected to the controller. The controller is connected to a control interface of the motor drive module, and the position control module is connected in series between the controller and the motor drive module to form a control loop. The power supply module is directly or indirectly connected to a drive interface of the motor drive module, to input power to the motor drive module. The motor drive module is connected to the motor to form a drive loop.

In another aspect, the motor drive module comprises a first motor drive diode, a second motor drive diode, a first relay and a second relay. The anode of the first motor drive diode and the anode of the second motor drive diode are connected to each other, the cathode of the first motor drive diode is connected to a controller connector, and the cathode of the second motor drive diode is connected to the position control module. A control coil of the first relay is connected in parallel with the second motor drive diode and a control coil of the second relay is connected in parallel with the first motor drive diode. The first relay and the second relay each include a normally open contact, a normally closed contact, and a common contact. The normally open contacts are each connected to the positive power supply from the power module and the normally closed contacts are each connected to ground. The common contact of the first relay is connected to a negative terminal of the motor and the common contact of the second relay is connected to a positive terminal of the motor.

In another aspect, a first motor drive capacitor is connected in parallel with the first motor drive diode, and a second motor drive capacitor is connected in parallel with the second motor drive diode. In a further aspect, at least one transient voltage suppressor (TVS) is connected in parallel with the motor.

In another aspect, the position control module includes a first travel switch and a second travel switch. A position control module diode is connected in parallel with the first travel switch, and a second position control module diode is connected in parallel with the second travel switch. The anode of the first position control module diode is connected to the anode of the second position control module diode. The cathode of the first position control module diode is connected to a controller connector, and the cathode of the second position control module diode is connected to the motor drive module.

In another aspect, the power module may include or input from a +12V external power supply, a +12V battery, or an on-board +12V power supply.

In another aspect, the controller is a manual controller and comprises a power input interface, a first control switch, and a second control switch. A first contact of each of the first control switch and the second control switch is connected to the +12V power supply, and a second contact of each of the first control switch and the second control switch is connected to ground. In another aspect, a power input diode is connected in series between the positive power input and a controller connector, and a power input capacitor is connected between the positive power input and ground.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A drive control system for a linear driver, comprising:
a power module;
a controller;
a motor drive module;
a motor; and
a position control module, wherein
the power module is connected to the controller, the controller is connected to a control interface of the motor drive module, and the position control module is connected in series between the controller and the motor drive module to form a control loop, and
the power module is connected to a drive interface of the motor drive module and the motor drive module is connected to the motor to form a drive loop;
the controller comprises:
a power input terminal connected to the power module;
a first control switch configured to control a forward rotation of the motor; and
a second control switch configured to control a reverse rotation of the motor, wherein
a first contact terminal of each of the first control switch and the second control switch is connected to the power module, and a second contact terminal of each of the first control switch and the second control switch is connected to a ground.

2. The drive control system of claim 1, wherein the motor drive module comprises:
a first motor drive diode and a second motor drive diode; and
a first relay and a second relay, wherein
an anode of the first motor drive diode is connected to an anode of the second motor drive diode, a cathode of the first motor drive diode is connected to the position control module, and a cathode of the second motor drive diode is connected to the power supply module through a controller connector,
the first relay comprises a control coil connected in parallel with the second motor drive diode and the second relay comprises a control coil connected in parallel with the first motor drive diode, and
each of the first relay and the second relay comprises:
a normally open contact connected to the power module;
a normally closed contact connected to a ground; and
a common contact connected to the motor.

3. The drive control system of claim 2, further comprising a first motor drive capacitor and a second motor drive capacitor, wherein the first motor drive capacitor is connected in parallel with the first motor drive diode and the second motor drive capacitor is connected in parallel with the second motor drive diode.

4. The drive control system of claim 1, wherein the position control module comprises:
a first travel switch and a second travel switch; and
a first position control diode and a second position control diode, wherein
the first position control diode is connected in parallel with the first travel switch and the second position control diode D-B is connected in parallel with the second travel switch, and
an anode of the first position control diode is connected to an anode of the second position control diode, a cathode of the first position control diode is connected to the controller, and a cathode of the second position control diode is connected to the motor drive module.

5. The drive control system of claim 1, wherein the power module comprises a +12V external power supply, a +12V battery, or an on-board +12V power supply.

6. The drive control system of claim 1, wherein the controller is a manual controller, and a controller connector connects the controller to each of the position control module and the motor drive module.

7. The drive control system of claim 1, further comprising a transient voltage suppression (TVS) tube, wherein the TVS tube is connected in parallel with the motor.

8. The drive control system of claim 1, further comprising a power input diode, wherein the power input diode is connected in series with a positive power input of the power supply module.

9. The drive control system of claim 1, further comprising a power input capacitor, wherein the power input capacitor is connected between a positive power input and a ground of the power module.

10. A drive control system for a linear driver, comprising:
a controller;
a linear driver control loop including a power module; and
a controller connector connected to each of the power module, the controller, and the linear driver control loop, wherein
the power module provides a power supply to the controller via the controller connector, and the controller provides a power input to the control loop via the controller connector;
the controller comprises:
a power input terminal connected to the power module;
a first control switch configured to control a forward rotation of the motor; and
a second control switch configured to control a reverse rotation of the motor, wherein
a first contact terminal of each of the first control switch and the second control switch is connected to the power module, and a second contact terminal of each of the first control switch and the second control switch is connected to a ground.

11. The drive control system of claim 10, wherein the controller comprises a switch that is operative to provide a power input to the control loop.

12. The drive control system of claim 10, wherein the control loop further comprises:
a motor drive module; and
a position control module, wherein
the controller is connected to a control interface of the motor drive module, and the position control module is connected in series between the controller and the motor drive module.

13. The drive control system of claim 12, wherein the power module is connected to a drive interface of the motor drive module and the motor drive module is connected to a motor to form a drive loop.

14. The drive control system of claim 12, wherein the controller connector connects the controller to each of the position control module and the motor drive module.

15. The drive control system of claim 10, wherein the power module comprises a +12V external power supply, a +12V battery, or an on-board +12V power supply.

16. A method for controlling a linear driver with a drive control system, comprising:
providing a power supply from a power module to a controller;
providing a power input from the controller to one of a control interface of a motor drive module and a position control module, wherein the power module is connected to the controller, the controller is connected to a control interface of the motor drive module, and the position control module is connected in series between the controller and the motor drive module to form a control loop; and
providing a power supply to a drive interface of the motor drive module, wherein the motor drive module is connected to a motor to form a drive loop;
wherein the controller comprises:
a power input terminal connected to the power module;
a first control switch configured to control a forward rotation of the motor; and
a second control switch configured to control a reverse rotation of the motor, wherein
a first contact terminal of each of the first control switch and the second control switch is connected to the power module, and a second contact terminal of each of the first control switch and the second control switch is connected to a ground.

17. The method of claim 16, wherein the motor drive module is operative to drive the motor in a forward or reverse direction.

18. The method of claim 16, further comprising starting the motor via the drive loop.

19. The method of claim 18, further comprising stopping the motor via the control loop.

* * * * *